United States Patent
Or-Chen et al.

(10) Patent No.: US 10,273,372 B2
(45) Date of Patent: Apr. 30, 2019

(54) TEXTILE PRINTING

(71) Applicant: HP INDIGO B.V., Amstelveen (NL)

(72) Inventors: Dafna Or-Chen, Nes Ziona (IL); Hannoch Ron, Kadima (IL); Eyal Joseph, Nes Ziona (IL)

(73) Assignee: HP Indigo B.V., Amstelveen (NL)

( * ) Notice: Subject to any disclaimer, the term of this patent is extended or adjusted under 35 U.S.C. 154(b) by 0 days.

(21) Appl. No.: 15/547,424

(22) PCT Filed: Apr. 7, 2015

(86) PCT No.: PCT/EP2015/057514
§ 371 (c)(1),
(2) Date: Jul. 28, 2017

(87) PCT Pub. No.: WO2016/162052
PCT Pub. Date: Oct. 13, 2016

(65) Prior Publication Data
US 2018/0044546 A1  Feb. 15, 2018

(51) Int. Cl.
C09D 11/00 (2014.01)
C09D 11/101 (2014.01)
C09D 11/52 (2014.01)
G03G 7/00 (2006.01)
G03G 8/00 (2006.01)
G03G 9/12 (2006.01)
D06P 1/52 (2006.01)
D06P 5/20 (2006.01)
G03G 15/16 (2006.01)

(52) U.S. Cl.
CPC ........... *C09D 11/101* (2013.01); *C09D 11/00* (2013.01); *C09D 11/52* (2013.01); *D06P 1/525* (2013.01); *D06P 1/5285* (2013.01); *D06P 5/2005* (2013.01); *G03G 7/0093* (2013.01); *G03G 8/00* (2013.01); *G03G 9/12* (2013.01); *G03G 15/1625* (2013.01); *G03G 2215/00312* (2013.01); *G03G 2215/00527* (2013.01)

(58) Field of Classification Search
CPC ....... C09D 11/00; C09D 11/101; C09D 11/52; G03G 7/0093; G03G 9/12; G03G 2215/00527; D06P 1/525
See application file for complete search history.

(56) References Cited

U.S. PATENT DOCUMENTS

| 6,291,023 B1 | 9/2001 | Nigam | |
| 7,767,294 B2 | 8/2010 | Cooper | |
| 2004/0028825 A1 | 2/2004 | Manes | |
| 2005/0012799 A1* | 1/2005 | Speich | B41J 2/01 347/104 |
| 2009/0226632 A1 | 9/2009 | Oberski et al. | |
| 2013/0004667 A1* | 1/2013 | Hood | C08F 12/22 427/256 |
| 2014/0147783 A1 | 5/2014 | Chun et al. | |

FOREIGN PATENT DOCUMENTS

| EP | 1270680 | 1/2003 |
| JP | H10018166 | 1/1998 |
| JP | H11295915 | 10/1999 |
| JP | 2003089756 | 3/2003 |
| JP | 2008139900 | 6/2008 |
| JP | 2008255522 | 10/2008 |
| JP | 2009256553 | 11/2009 |

OTHER PUBLICATIONS

International Search Report and Written Opinion for International Application No. PCT/EP2015/057514 dated Dec. 14, 2015, 10 pages.

* cited by examiner

*Primary Examiner* — Eisa B Elhilo
(74) *Attorney, Agent, or Firm* — Dierker & Kavanaugh PC

(57) ABSTRACT

Herein is described a method of printing an image on a textile. The method comprises electrophotographically printing an image onto a textile substrate using an electrophotographic ink composition, applying a coating composition comprising a polymer and a crosslinking agent to the printed electrophotographic ink, and crosslinking the applied coating composition.

19 Claims, No Drawings

TEXTILE PRINTING

BACKGROUND

Xerographic or electrophotographic printing typically involves creating an image on a photoconductive surface, applying an ink having charged particles to the photoconductive surface, such that they selectively bind to the image, and then transferring the charged particles in the form of the image to a print substrate.

In "dry" xerography, an electrostatic image is created on a photoconducting drum or belt. The image is developed using a pigmented dry powder or toner and then transferred to a substrate, typically paper. The image is then fused onto the substrate a dry powder toner is applied on the surface of the substrate as a powder. The toner is then melted to fuse the toner to the substrate to form the image. In "wet" xerography, an electrostatic ink composition comprising charged toner particles in a carrier liquid can be brought into contact with the selectively charged photoconductive surface. The charged toner particles adhere to the image areas of the latent image while the background areas remain clean. The image is then transferred to a print substrate (e.g. paper) directly or, more commonly, by being first transferred to an intermediate transfer member, which can be a soft swelling blanket, and then to the print substrate.

Electrophotographic printing is commonly used to print images on substrates, such as paper.

Textile printing is a method of applying colour to fabric, for example, in definite patterns or designs. The colour is typically bonded with the fibre, so as to resist washing and friction. In printing, wooden blocks, stencils, engraved plates, rollers, or screens can be used to place colours on the fabric. Screen printing is by one of the most common technology today. Two types exist: rotary screen printing and flat (bed) screen printing. A blade (squeegee) squeezes the printing paste through openings in the screen onto the fabric.

DETAILED DESCRIPTION

Before the present disclosure is disclosed and described, it is to be understood that this disclosure is not limited to the particular process steps and materials disclosed herein because such process steps and materials may vary somewhat. It is also to be understood that the terminology used herein is used for the purpose of describing particular embodiments. The terms are not intended to be limiting because the scope is intended to be limited by the appended claims and equivalents thereof.

It is noted that, as used in this specification and the appended claims, the singular forms "a," "an," and "the" include plural referents unless the context clearly dictates otherwise.

As used herein, "carrier fluid", "carrier liquid," "carrier," or "carrier vehicle" refers to the fluid in which the polymers, particles, colorant, charge directors and other additives can be dispersed to form a liquid electrostatic, xerographic or electrophotographic composition. The carrier liquids may include a mixture of a variety of different agents, such as surfactants, co-solvents, viscosity modifiers, and/or other possible ingredients.

As used herein, "electrophotographic composition" or "xerographic composition" refers to a composition, which may be in liquid or powder form, that is typically suitable for use in an electrophotographic process and which is free from pigment. The electrophotographic composition may comprise chargeable particles of a resin.

As used herein, "co-polymer" refers to a polymer that is polymerized from at least two monomers.

As used herein, "melt flow rate" generally refers to the extrusion rate of a resin through an orifice of defined dimensions at a specified temperature and load, usually reported as temperature/load, e.g. 190° C./2.16 kg. Flow rates can be used to differentiate grades or provide a measure of degradation of a material as a result of molding. In the present disclosure, "melt flow rate" is measured per ASTM D1238-04c Standard Test Method for Melt Flow Rates of Thermoplastics by Extrusion Plastometer, as known in the art. If a melt flow rate of a particular polymer is specified, unless otherwise stated, it is the melt flow rate for that polymer alone, in the absence of any of the other components of the electrostatic composition.

As used herein, "acidity," "acid number," or "acid value" refers to the mass of potassium hydroxide (KOH) in milligrams that neutralizes one gram of a substance. The acidity of a polymer can be measured according to standard techniques, for example as described in ASTM D1386. If the acidity of a particular polymer is specified, unless otherwise stated, it is the acidity for that polymer alone, in the absence of any of the other components of the liquid toner composition.

As used herein, "melt viscosity" generally refers to the ratio of shear stress to shear rate at a given shear stress or shear rate. Testing is generally performed using a capillary rheometer. A plastic charge is heated in the rheometer barrel and is forced through a die with a plunger. The plunger is pushed either by a constant force or at constant rate depending on the equipment. Measurements are taken once the system has reached steady-state operation. One method used is measuring Brookfield viscosity @ 140° C., units are mPa-s or cPoise, as known in the art. Alternatively, the melt viscosity can be measured using a rheometer, e.g. a commercially available AR-2000 Rheometer from Thermal Analysis Instruments, using the geometry of: 25 mm steel plate-standard steel parallel plate, and finding the plate over plate rheometry isotherm at 120° C., 0.01 Hz shear rate. If the melt viscosity of a particular polymer is specified, unless otherwise stated, it is the melt viscosity for that polymer alone, in the absence of any of the other components of the electrostatic composition.

A certain monomer may be described herein as constituting a certain weight percentage of a polymer. This indicates that the repeating units formed from the said monomer in the polymer constitute said weight percentage of the polymer.

If a standard test is mentioned herein, unless otherwise stated, the version of the test to be referred to is the most recent at the time of filing this patent application.

As used herein, "xerographic", "electrostatic printing" or "electrophotographic printing" generally refers to the process that provides an image that is transferred from a photo imaging substrate either directly or indirectly via an intermediate transfer member to a print substrate. As such, the image is not substantially absorbed into the photo imaging substrate on which it is applied. Additionally, "xerographic", "electrophotographic printers" or "electrostatic printers" generally refer to those printers capable of performing electrophotographic printing or electrostatic printing, as described above. "Liquid electrophotographic printing" is a specific type of electrophotographic printing where a liquid composition is employed in the electrophotographic process rather than a powder toner. An electrostatic printing process may involve subjecting the electrostatic composition to an electric field, e.g. an electric field having a field gradient of 50-400 V/μm, or more, in some examples 600-900 V/μm, or more.

As used herein, "substituted" may indicate that a hydrogen atom of a compound or moiety is replaced by another atom such as a carbon atom or a heteroatom, which is part of a group referred to as a substituent. Substituents include, for example, alkyl, alkoxy, aryl, aryloxy, alkenyl, alkenoxy, alkynyl, alkynoxy, thioalkyl, thioalkenyl, thioalkynyl, thioaryl, etc.

As used herein, "heteroatom" may refer to nitrogen, oxygen, halogens, phosphorus, or sulfur.

As used herein, "alkyl", or similar expressions such as "alk" in alkaryl, may refer to a branched, unbranched, or cyclic saturated hydrocarbon group, which may, in some examples, contain from 1 to about 50 carbon atoms, or 1 to about 40 carbon atoms, or 1 to about 30 carbon atoms, or 1 to about 10 carbon atoms, or 1 to about 5 carbon atoms for example.

The term "aryl" may refer to a group containing a single aromatic ring or multiple aromatic rings that are fused together, directly linked, or indirectly linked (such that the different aromatic rings are bound to a common group such as a methylene or ethylene moiety). Aryl groups described herein may contain, but are not limited to, from 5 to about 50 carbon atoms, or 5 to about 40 carbon atoms, or 5 to 30 carbon atoms or more, and may be selected from, phenyl and naphthyl.

As used herein, the term "about" is used to provide flexibility to a numerical range endpoint by providing that a given value may be a little above or a little below the endpoint to allow for variation in test methods or apparatus. The degree of flexibility of this term can be dictated by the particular variable and would be within the knowledge of those skilled in the art to determine based on experience and the associated description herein.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Concentrations, amounts, and other numerical data may be expressed or presented herein in a range format. It is to be understood that such a range format is used merely for convenience and brevity and thus should be interpreted flexibly to include not just the numerical values explicitly recited as the limits of the range, but also to include all the individual numerical values or sub-ranges encompassed within that range as if each numerical value and sub-range is explicitly recited. As an illustration, a numerical range of "about 1 wt % to about 5 wt %" should be interpreted to include not just the explicitly recited values of about 1 wt % to about 5 wt %, but also include individual values and sub-ranges within the indicated range. Thus, included in this numerical range are individual values such as 2, 3.5, and 4 and sub-ranges such as from 1-3, from 2-4, and from 3-5, etc. This same principle applies to ranges reciting a single numerical value. Furthermore, such an interpretation should apply regardless of the breadth of the range or the characteristics being described.

As used herein, wt % values are to be taken as referring to a weight-for-weight (w/w) percentage of solids in the composition, and not including the weight of any carrier fluid present.

In an aspect, the present disclosure provides a method of printing an image on a textile. The method comprises electrophotographically printing an image onto a textile substrate using an electrophotographic ink composition, applying a coating composition comprising a polymer and a crosslinking agent to the printed electrophotographic ink, and crosslinking the applied coating composition.

In another aspect, the present disclosure provides a printed textile comprising
a textile substrate,
a layer of electrophotographically printed ink printed on the substrate, and
a crosslinked polymer coating deposited on the layer of electrophotographically printed ink.

By applying a crosslinked coating composition comprising a polymer over the printed image formed of the electrophotographic ink, it is possible to form a durable electrophotographically printed image on a textile substrate (see below). This allows textile substrates to be printed efficiently and cost-effectively, as electrophotographic printing typically involves fewer processing steps than conventional methods of textile printing, such as screen printing. Furthermore, the use of harmful solvents can be avoided, allowing textiles to be printed in an environmentally friendly manner.

The method described herein may also allow a durable electrophotographic image to be formed on a textile substrate. For example, the image may be sufficiently resistant to one or more laundry cycles. In some examples, the method described herein may allow textile substrates to be electrophotographically printed with a detergent-resistant image.

The electrophotographic ink may be printed onto the surface of the textile substrate. In some examples, the bulk of the electrophotographic ink is not absorbed by the fibres of the substrate. Without wishing to be bound by any theory, the crosslinked coating adheres to the electrophotographically printed image, protecting the image from detachment, for example, by detergent, heat and/or abrasion encountered during a washing cycle(s).

The electrophotographic ink may be printed on a textile using an electrophotographic printer. The printed textile substrate may be dried prior to coating. The coating may be applied at any suitable thickness. For example, the coating may form a crosslinked polymer layer that is 0.5 to 50 microns, for instance, 1 to 10 microns thick.

In one example, the polymer coating is applied as an aqueous polymer solution or aqueous polymer dispersion. The polymer coating may be applied using any suitable method. For example, it may be spread, knife-coated, roll-coated, wire rod drawn, dipped, sprayed, jetted or (e.g. indirect) gravure coated over the printed textile.

In one example, the polymer coating comprises a polymer having at least one cross-linkable moiety. The cross-linkable moiety may be an unsaturated group. Suitable unsaturated groups include CN and/or C=O groups. In one example, the polymer coating comprises a polymer having a carboxyl group. In one example, the polymer coating comprises a polymer having an isocyanurate or isocyanate group. The cross-linkable moiety may be crosslinked to form an ester linkage. In some examples, the polymer may be selected from an acrylic- or polyurethane-based polymer. In one example, the polymer is a styrene-acrylic polymer or a polyurethane polymer. Specific examples include ACTEGA ACTDigiles, Water Lac 1960 acrylic emulsion, Water Lac 1320 acrylic emulsion, PLASTOPRINT PM (polyurethane thermoplastic coating) AVCO CHEMICALS LTD, AVCO-PRINT ABZ-500 styrene (acrylic based) AVCO CHEMICALS LTD, AVCOPRINT SAZSPSYNTOPRET OL-V (thermoplastic polyurethane) AVCO CHEMICALS LTD and AVCOPRINT SAZ (acrylic based) AVCO CHEMICALS LTD.

The polymer coating comprises a crosslinking agent. Suitable crosslinking agents include blocked (poly) isocyanate. The crosslinking agent may be used in any suitable amount. For example, it may be added in an amount of up to 10 weight %, for instance, 2 or 2.5 to 5 weight %, of the total weight of the crosslinking agent and polymer in the polymer coating.

In some examples, the polymer coating is crosslinked by exposure to heat and/or UV. Where heat is used, the coated textile may be exposed to temperatures of above 50 degrees C., for example, 70 to 200 degrees C.

In some examples, the crosslinked polymer coating formed on the printed textile substrate is a water-resistant coating. The water-resistant nature of the coating may improve the washing- or detergent-resistance of the printed image.

The textile substrate may be treated with a primer polymer coating prior to electrophotographic printing. The primer polymer may contain a polar group, such as a heteroatom or heteroatom-containing group. Suitable heteroatoms include O, N, S or halogen (e.g. F, Cl, Br). In some examples, the primer polymer contains a hydroxyl, carbonyl or amine group. The primer polymer may contain a group that forms, for example, a hydrogen bond with the acid polymer in the electrophotographic ink composition. Without being bound by any theory, the interaction may improve the detergent-resistance of the printed image. Examples of suitable primer polymers include ethylene acrylic acid, polyethylene imine and polyamide resins. The primer polymer coating may be applied as an aqueous dispersion. This may be dried prior to the electrophotographic step.

Any suitable electrophotographic ink may be employed. For example, the electrophotographic ink may be a powder or liquid ink. The ink comprises toner particles comprising a colorant and a polymer The ink may also comprise charge directors and/or charge adjuvants.

Colorants

The colorant may be selected from a pigment, dye and a combination thereof. The colorant may be transparent, unicolor or composed of any combination of available colours. The colorant may be selected from a cyan colorant, a yellow colorant, a magenta colorant and a black colorant. The electrophotographic composition may include a plurality of colorants. The electrophotographic composition may include a first colorant and second colorant, which are different from one another. Further colorants may also be present with the first and second colorants. The electrophotographic composition may include first and second colorants where each is independently selected from a cyan colorant, a yellow colorant, a magenta colorant and a black colorant. In some examples, the first colorant includes a black colorant, and the second colorant includes a non-black colorant, for example a colorant selected from a cyan colorant, a yellow colorant and a magenta colorant. The colorant may be selected from a phthalocyanine colorant, an indigold colorant, an indanthrone colorant, a monoazo colorant, a diazo colorant, inorganic salts and complexes, dioxazine colorant, perylene colorant, anthraquinone colorants, and any combination thereof.

Polymer Resin

The electrophotographic ink composition (e.g. the toner particles) can comprise a polymer resin. The polymer resin may comprise a thermoplastic polymer. A thermoplastic polymer is sometimes referred to as a thermoplastic resin. The polymer resin may comprise co-polymers of ethylene and an ethylenically unsaturated acid of either acrylic acid or methacrylic acid. In some examples, the polymer may be selected from ethylene or propylene acrylic acid co-polymers; ethylene or propylene methacrylic acid co-polymers; ethylene vinyl acetate co-polymers; co-polymers of ethylene or propylene (e.g. 80 wt % to 99.9 wt %), and alkyl (e.g. Cl to C5) ester of methacrylic or acrylic acid (e.g. 0.1 wt % to 20 wt %); co-polymers of ethylene (e.g. 80 wt % to 99.9 wt %), acrylic or methacrylic acid (e.g. 0.1 wt % to 20.0 wt %) and alkyl (e.g. Cl to C5) ester of methacrylic or acrylic acid (e.g. 0.1 wt % to 20 wt %); co-polymers of ethylene or propylene (e.g. 70 wt % to 99.9 wt %) and maleic anhydride (e.g. 0.1 wt % to 30 wt %); polyethylene; polystyrene; isotactic polypropylene (crystalline); co-polymers of ethylene ethylene ethyl acrylate; polyesters; polyvinyl toluene; polyamides; styrene/butadiene co-polymers; epoxy resins; acrylic resins (e.g. co-polymer of acrylic or methacrylic acid and at least one alkyl ester of acrylic or methacrylic acid wherein alkyl may have from 1 to about 20 carbon atoms, such as methyl methacrylate (e.g. 50% to 90%)/methacrylic acid (e.g. 0 wt % to 20 wt %)/ethylhexylacrylate (e.g. 10 wt % to 50 wt %)); ethylene-acrylate terpolymers: ethylene-acrylic esters-maleic anhydride (MAH) or glycidyl methacrylate (GMA) terpolymers; ethylene-acrylic acid ionomers and combinations thereof.

The resin may comprise a polymer having acidic side groups. Examples of the polymer having acidic side groups will now be described. The polymer having acidic side groups may have an acidity of 50 mg KOH/g or more, in some examples an acidity of 60 mg KOH/g or more, in some examples an acidity of 70 mg KOH/g or more, in some examples an acidity of 80 mg KOH/g or more, in some examples an acidity of 90 mg KOH/g or more, in some examples an acidity of 100 mg KOH/g or more, in some examples an acidity of 105 mg KOH/g or more, in some examples 110 mg KOH/g or more, in some examples 115 mg KOH/g or more. The polymer having acidic side groups may have an acidity of 200 mg KOH/g or less, in some examples 190 mg or less, in some examples 180 mg or less, in some examples 130 mg KOH/g or less, in some examples 120 mg KOH/g or less. Acidity of a polymer, as measured in mg KOH/g can be measured using standard procedures known in the art, for example using the procedure described in ASTM D1386.

The resin may comprise a polymer, in some examples a polymer having acidic side groups, that has a melt flow rate of less than about 70 g/10 minutes, in some examples about 60 g/10 minutes or less, in some examples about 50 g/10 minutes or less, in some examples about 40 g/10 minutes or less, in some examples 30 g/10 minutes or less, in some examples 20 g/10 minutes or less, in some examples 10 g/10 minutes or less. In some examples, all polymers having acidic side groups and/or ester groups in the particles each individually have a melt flow rate of less than 90 g/10 minutes, 80 g/10 minutes or less, in some examples 80 g/10 minutes or less, in some examples 70 g/10 minutes or less, in some examples 70 g/10 minutes or less, in some examples 60 g/10 minutes or less.

The polymer having acidic side groups can have a melt flow rate of about 10 g/10 minutes to about 120 g/10 minutes, in some examples about 10 g/10 minutes to about 70 g/10 minutes, in some examples about 10 g/10 minutes to 40 g/10 minutes, in some examples 20 g/10 minutes to 30 g/10 minutes. The polymer having acidic side groups can have a melt flow rate of, in some examples, about 50 g/10 minutes to about 120 g/10 minutes, in some examples 60 g/10 minutes to about 100 g/10 minutes. The melt flow rate can be measured using standard procedures known in the art, for example as described in ASTM D1238.

The acidic side groups may be in free acid form or may be in the form of an anion and associated with one or more counterions, typically metal counterions, e.g. a metal selected from the alkali metals, such as lithium, sodium and potassium, alkali earth metals, such as magnesium or calcium, and transition metals, such as zinc. The polymer having acidic sides groups can be selected from resins such as co-polymers of ethylene and an ethylenically unsaturated acid of either acrylic acid or methacrylic acid; and ionomers thereof, such as methacrylic acid and ethylene-acrylic or methacrylic acid co-polymers which are at least partially neutralized with metal ions (e.g. Zn, Na, Li) such as SUR-LYN® ionomers. The polymer comprising acidic side groups can be a co-polymer of ethylene and an ethylenically unsaturated acid of either acrylic or methacrylic acid, where the ethylenically unsaturated acid of either acrylic or methacrylic acid constitute from 5 wt % to about 25 wt % of the co-polymer, in some examples from 10 wt % to about 20 wt % of the co-polymer.

The resin may comprise two different polymers having acidic side groups. The two polymers having acidic side groups may have different acidities, which may fall within the ranges mentioned above. The resin may comprise a first polymer having acidic side groups that has an acidity of from 10 mg KOH/g to 110 mg KOH/g, in some examples 20 mg KOH/g to 110 mg KOH/g, in some examples 30 mg KOH/g to 110 mg KOH/g, in some examples 50 mg KOH/g to 110 mg KOH/g, and a second polymer having acidic side groups that has an acidity of 110 mg KOH/g to 130 mg KOH/g.

The resin may comprise two different polymers having acidic side groups: a first polymer having acidic side groups that has a melt flow rate of about 10 g/10 minutes to about 50 g/10 minutes and an acidity of from 10 mg KOH/g to 110 mg KOH/g, in some examples 20 mg KOH/g to 110 mg KOH/g, in some examples 30 mg KOH/g to 110 mg KOH/g, in some examples 50 mg KOH/g to 110 mg KOH/g, and a second polymer having acidic side groups that has a melt flow rate of about 50 g/10 minutes to about 120 g/10 minutes and an acidity of 110 mg KOH/g to 130 mg KOH/g. The first and second polymers may be absent of ester groups.

The ratio of the first polymer having acidic side groups to the second polymer having acidic side groups can be from about 10:1 to about 2:1. The ratio can be from about 6:1 to about 3:1, in some examples about 4:1.

The resin may comprise a polymer having a melt viscosity of 15000 poise or less, in some examples a melt viscosity of 10000 poise or less, in some examples 1000 poise or less, in some examples 100 poise or less, in some examples 50 poise or less, in some examples 10 poise or less; said polymer may be a polymer having acidic side groups as described herein. The resin may comprise a first polymer having a melt viscosity of 15000 poise or more, in some examples 20000 poise or more, in some examples 50000 poise or more, in some examples 70000 poise or more; and in some examples, the resin may comprise a second polymer having a melt viscosity less than the first polymer, in some examples a melt viscosity of 15000 poise or less, in some examples a melt viscosity of 10000 poise or less, in some examples 1000 poise or less, in some examples 100 poise or less, in some examples 50 poise or less, in some examples 10 poise or less. The resin may comprise a first polymer having a melt viscosity of more than 60000 poise, in some examples from 60000 poise to 100000 poise, in some examples from 65000 poise to 85000 poise; a second polymer having a melt viscosity of from 15000 poise to 40000 poise, in some examples 20000 poise to 30000 poise, and a third polymer having a melt viscosity of 15000 poise or less, in some examples a melt viscosity of 10000 poise or less, in some examples 1000 poise or less, in some examples 100 poise or less, in some examples 50 poise or less, in some examples 10 poise or less; an example of the first polymer is Nucrel 960 (from DuPont), and example of the second polymer is Nucrel 699 (from DuPont), and an example of the third polymer is AC-5120 or AC-5180 (from Honeywell). The first, second and third polymers may be polymers having acidic side groups as described herein. The melt viscosity can be measured using a rheometer, e.g. a commercially available AR-2000 Rheometer from Thermal Analysis Instruments, using the geometry of: 25 mm steel plate-standard steel parallel plate, and finding the plate over plate rheometry isotherm at 120° C., 0.01 hz shear rate.

If the resin in the composition comprises a single type of polymer, the polymer (excluding any other components of the electrostatic composition) may have a melt viscosity of 6000 poise or more, in some examples a melt viscosity of 8000 poise or more, in some examples a melt viscosity of 10000 poise or more, in some examples a melt viscosity of 12000 poise or more. If the resin comprises a plurality of polymers all the polymers of the resin may together form a mixture (excluding any other components of the electrostatic composition) that has a melt viscosity of 6000 poise or more, in some examples a melt viscosity of 8000 poise or more, in some examples a melt viscosity of 10000 poise or more, in some examples a melt viscosity of 12000 poise or more. Melt viscosity can be measured using standard techniques. The melt viscosity can be measured using a rheometer, e.g. a commercially available AR-2000 Rheometer from Thermal Analysis Instruments, using the geometry of: 25 mm steel plate-standard steel parallel plate, and finding the plate over plate rheometry isotherm at 120° C., 0.01 hz shear rate.

The resin may comprise two different polymers having acidic side groups that are selected from co-polymers of ethylene and an ethylenically unsaturated acid of either acrylic acid or methacrylic acid; or ionomers thereof, such as methacrylic acid and ethylene-acrylic or methacrylic acid co-polymers which are at least partially neutralized with metal ions (e.g. Zn, Na, Li) such as SURLYN® ionomers. The resin may comprise (i) a first polymer that is a co-polymer of ethylene and an ethylenically unsaturated acid of either acrylic acid and methacrylic acid, wherein the ethylenically unsaturated acid of either acrylic or methacrylic acid constitutes from 8 wt % to about 16 wt % of the co-polymer, in some examples 10 wt % to 16 wt % of the co-polymer; and (ii) a second polymer that is a co-polymer of ethylene and an ethylenically unsaturated acid of either acrylic acid and methacrylic acid, wherein the ethylenically unsaturated acid of either acrylic or methacrylic acid constitutes from 12 wt % to about 30 wt % of the co-polymer, in some examples from 14 wt % to about 20 wt % of the co-polymer, in some examples from 16 wt % to about 20 wt % of the co-polymer in some examples from 17 wt % to 19 wt % of the co-polymer.

The resin may comprise a polymer having acidic side groups, as described above (which may be free of ester side groups), and a polymer having ester side groups. The polymer having ester side groups may be a thermoplastic polymer. The polymer having ester side groups may further comprise acidic side groups. The polymer having ester side groups may be a co-polymer of a monomer having ester side groups and a monomer having acidic side groups. The polymer may be a co-polymer of a monomer having ester side groups, a monomer having acidic side groups, and a monomer absent of any acidic and ester side groups. The monomer having ester side groups may be a monomer selected from esterified acrylic acid or esterified methacrylic acid. The monomer having acidic side groups may be a monomer selected from acrylic or methacrylic acid. The monomer absent of any acidic and ester side groups may be an alkylene monomer, including, but not limited to, ethylene or propylene. The esterified acrylic acid or esterified methacrylic acid may, respectively, be an alkyl ester of acrylic acid or an alkyl ester of methacrylic acid. The alkyl group in the alkyl ester of acrylic or methacrylic acid may be an alkyl group having 1 to 30 carbons, in some examples 1 to 20 carbons, in some examples 1 to 10 carbons; in some examples selected from methyl, ethyl, iso-propyl, n-propyl, t-butyl, iso-butyl, n-butyl and pentyl.

The polymer having ester side groups may be a co-polymer of a first monomer having ester side groups, a second monomer having acidic side groups and a third monomer which is an alkylene monomer absent of any acidic and ester side groups. The polymer having ester side groups may be a co-polymer of (i) a first monomer having ester side groups selected from esterified acrylic acid or esterified methacrylic acid, in some examples an alkyl ester of acrylic or methacrylic acid, (ii) a second monomer having acidic side groups selected from acrylic or methacrylic acid and (iii) a third monomer which is an alkylene monomer selected from ethylene and propylene. The first monomer may constitute 1% to 50% by weight of the co-polymer, in some examples 5% to 40% by weight, in some examples 5% to 20% by weight of the co-polymer, in some examples 5% to 15% by weight of the co-polymer. The second monomer may constitute 1% to 50% by weight of the co-polymer, in some examples 5% to 40% by weight of the co-polymer, in some examples 5% to 20% by weight of the co-polymer, in some examples 5% to 15% by weight of the co-polymer. The first monomer can constitute 5% to 40% by weight of the co-polymer, the second monomer constitutes 5% to 40% by weight of the co-polymer, and with the third monomer constituting the remaining weight of the co-polymer. In some examples, the first monomer constitutes 5% to 15% by weight of the co-polymer, the second monomer constitutes 5% to 15% by weight of the co-polymer, with the third monomer constituting the remaining weight of the co-polymer. In some examples, the first monomer constitutes 8% to 12% by weight of the co-polymer, the second monomer constitutes 8% to 12% by weight of the co-polymer, with the third monomer constituting the remaining weight of the co-polymer. In some examples, the first monomer constitutes about 10% by weight of the co-polymer, the second monomer constitutes about 10% by weight of the co-polymer, and with the third monomer constituting the remaining weight of the co-polymer. The polymer may be selected from the Bynel® class of monomer, including Bynel 2022 and Bynel 2002, which are available from DuPont®.

The polymer having ester side groups may constitute 1% or more by weight of the total amount of the resin polymers, e.g. thermoplastic resin polymers, in the electrophotographic composition, e.g. the total amount of the polymer or polymers having acidic side groups and polymer having ester side groups. The polymer having ester side groups may constitute 5% or more by weight of the total amount of the resin polymers, e.g. thermoplastic resin polymers, in some examples 8% or more by weight of the total amount of the resin polymers, e.g. thermoplastic resin polymers, in some examples 10% or more by weight of the total amount of the resin polymers, e.g. thermoplastic resin polymers, in some examples 15% or more by weight of the total amount of the resin polymers, e.g. thermoplastic resin polymers, in some examples 20% or more by weight of the total amount of the resin polymers, e.g. thermoplastic resin polymers, in some examples 25% or more by weight of the total amount of the resin polymers, e.g. thermoplastic resin polymers, in some examples 30% or more by weight of the total amount of the resin polymers, e.g. thermoplastic resin polymers, in some examples 35% or more by weight of the total amount of the resin polymers, e.g. thermoplastic resin polymers, in the electrophotographic composition. The polymer having ester side groups may constitute from 5% to 50% by weight of the total amount of the resin polymers, e.g. thermoplastic resin polymers, in the electrophotographic composition, in some examples 10% to 40% by weight of the total amount of the resin polymers, e.g. thermoplastic resin polymers, in the electrophotographic composition, in some examples 5% to 30% by weight of the total amount of the resin polymers, e.g. thermoplastic resin polymers, in the electrophotographic composition, in some examples 5% to 15% by weight of the total amount of the resin polymers, e.g. thermoplastic resin polymers, in the electrophotographic composition in some examples 15% to 30% by weight of the total amount of the resin polymers, e.g. thermoplastic resin polymers, in the electrophotographic composition.

The polymer having ester side groups may have an acidity of 50 mg KOH/g or more, in some examples an acidity of 60 mg KOH/g or more, in some examples an acidity of 70 mg KOH/g or more, in some examples an acidity of 80 mg KOH/g or more. The polymer having ester side groups may have an acidity of 100 mg KOH/g or less, in some examples 90 mg KOH/g or less. The polymer having ester side groups may have an acidity of 60 mg KOH/g to 90 mg KOH/g, in some examples 70 mg KOH/g to 80 mg KOH/g.

The polymer having ester side groups may have a melt flow rate of about 10 g/10 minutes to about 120 g/10 minutes, in some examples about 10 g/10 minutes to about 50 g/10 minutes, in some examples about 20 g/10 minutes to about 40 g/10 minutes, in some examples about 25 g/10 minutes to about 35 g/10 minutes.

The polymer, polymers, co-polymer or co-polymers of the resin can in some examples be selected from the Nucrel family of toners (e.g. Nucrel 403™, Nucrel 407™, Nucrel 609HS™, Nucrel 908HS™, Nucrel 1202HC™, Nucrel 30707™, Nucrel 1214™, Nucrel 903™, Nucrel 3990™, Nucrel 910™, Nucrel 925™, Nucrel 699™, Nucrel 599™, Nucrel 960™, Nucrel RX 76™, Nucrel 2806™, Bynell 2002, Bynell 2014, Bynell 2020 and Bynell 2022, (sold by E. I. du PONT)), the Aclyn family of toners (e.g. Aclyn 201, Aclyn 246, Aclyn 285, and Aclyn 295), and the Lotader family of toners (e.g. Lotader 2210, Lotader, 3430, and Lotader 8200 (sold by Arkema)).

The resin can constitute about 5 to 90%, in some examples about 50 to 80%, by weight of the solids of the electrophotographic composition. The resin can constitute about 60 to 95%, in some examples about 70 to 95%, by weight of the solids of the electrophotographic composition.

Charge Director and Charge Adjuvant

The electrophotographic composition and/or the ink printed on the print substrate can comprise a charge director.

A charge director can be added to an electrostatic composition to impart a charge of a desired polarity and/or maintain sufficient electrostatic charge on the particles of an electrostatic composition. The charge director may comprise ionic compounds, including, but not limited to, metal salts of fatty acids, metal salts of sulfo-succinates, metal salts of oxyphosphates, metal salts of alkyl-benzenesulfonic acid, metal salts of aromatic carboxylic acids or sulfonic acids, as well as zwitterionic and non-ionic compounds, such as polyoxyethylated alkylamines, lecithin, polyvinylpyrrolidone, organic acid esters of polyvalent alcohols, etc. The charge director can be selected from, but is not limited to, oil-soluble petroleum sulfonates (e.g. neutral Calcium Petronate™, neutral Barium Petronate™, and basic Barium Petronate™), polybutylene succinimides (e.g. OLOA™ 1200 and Amoco 575), and glyceride salts (e.g. sodium salts of phosphated mono- and diglycerides with unsaturated and saturated acid substituents), sulfonic acid salts including, but not limited to, barium, sodium, calcium, and aluminium salts of sulfonic acid. The sulfonic acids may include, but are not limited to, alkyl sulfonic acids, aryl sulfonic acids, and sulfonic acids of alkyl succinates (e.g. see WO 2007/130069). The charge director can impart a negative charge or a positive charge on the resin-containing particles of an electrostatic composition.

The charge director can comprise a sulfosuccinate moiety of the general formula $[R_a—O—C(O)CH_2CH(SO_3^-)C(O)—O—R_b]$, where each of $R_a$ and $R_b$ is an alkyl group. In some examples, the charge director comprises nanoparticles of a simple salt and a sulfosuccinate salt of the general formula $MA_n$, wherein M is a metal, n is the valence of M, and A is an ion of the general formula $[R_a—O—C(O)CH_2CH(SO_3^-)C(O)—O—R_b]$, where each of $R_a$ and $R_b$ is an alkyl group, or other charge directors as found in WO2007130069, which is incorporation herein by reference in its entirety. As described in WO2007130069, the sulfosuccinate salt of the general formula $MA_n$ is an example of a micelle forming salt. The charge director may be substantially free or free of an acid of the general formula HA, where A is as described above. The charge director may comprise micelles of said sulfosuccinate salt enclosing at least some of the nanoparticles. The charge director may comprise at least some nanoparticles having a size of 200 nm or less, in some examples 2 nm or more. As described in WO2007130069, simple salts are salts that do not form micelles by themselves, although they may form a core for micelles with a micelle forming salt. The ions constructing the simple salts are all hydrophilic. The simple salt may comprise a cation selected from Mg, Ca, Ba, $NH_4$, tert-butyl ammonium, $Li^+$, and $Al^{+3}$, or from any sub-group thereof. The simple salt may comprise an anion selected from $SO_4^{2-}$, $PO^{3-}$, $NO_3^-$, $HPO_4^{2-}$, $CO_3^{2-}$, acetate, trifluoroacetate (TFA), $Cl^-$, $Bf^-$, $F^-$, $ClO_4^-$, and $TiO_3^{4-}$, or from any sub-group thereof. The simple salt may be selected from $CaCO_3$, $Ba_2TiO_3$, $Al_2(SO_4)$, $Al(NO_3)_3$, $Ca_3(PO_4)_2$, $BaSO_4$, $BaHPO_4$, $Ba_2(PO_4)_3$, $CaSO_4$, $(NH_4)_2CO_3$, $(NH_4)_2SO_4$, $NH_4OAc$, Tert-butyl ammonium bromide, $NH_4NO_3$, LiTFA, $Al_2(SO_4)_3$, $LiClO_4$ and $LiBF_4$, or any sub-group thereof. The charge director may further comprise basic barium petronate (BBP).

In the formula $[R_a—O—C(O)CH_2CH(SO_3^-)C(O)—O—R_b]$, in some examples, each of $R_a$ and $R_b$ is an aliphatic alkyl group. In some examples, each of $R_a$ and $R_b$ independently is a $C_{6-25}$ alkyl. In some examples, said aliphatic alkyl group is linear. In some examples, said aliphatic alkyl group is branched. In some examples, said aliphatic alkyl group includes a linear chain of more than 6 carbon atoms. In some examples, $R_a$ and $R_b$ are the same. In some examples, at least one of $R_a$ and $R_b$ is $C_{13}H_{27}$. In some examples, M is Na, K, Cs, Ca, or Ba. The formula $[R_a—O—C(O)CH_2CH(SO_3^-)C(O)—O—R_b]$ and/or the formula $MA_n$ may be as defined in any part of WO2007130069.

The charge director may comprise (i) soya lecithin, (ii) a barium sulfonate salt, such as basic barium petronate (BPP), and (iii) an isopropyl amine sulfonate salt. Basic barium petronate is a barium sulfonate salt of a 21-26 hydrocarbon alkyl, and can be obtained, for example, from Chemtura. An example isopropyl amine sulphonate salt is dodecyl benzene sulfonic acid isopropyl amine, which is available from Croda.

In an electrostatic composition, the charge director can constitute about 0.001% to 20%, in some examples 0.01 to 20% by weight, in some examples 0.01 to 10% by weight, in some examples 0.01 to 1% by weight of the solids of the electrostatic composition and/or ink printed on the print substrate. The charge director can constitute about 0.001 to 0.15% by weight of the solids of the liquid electrophotographic composition and/or ink printed on the print substrate, in some examples 0.001 to 0.15%, in some examples 0.001 to 0.02% by weight of the solids of the liquid electrophotographic composition and/or ink printed on the print substrate. In some examples, the charge director imparts a negative charge on the electrostatic composition. The particle conductivity may range from 50 to 500 pmho/cm, in some examples from 200-350 pmho/cm.

The liquid electrophotographic composition and/or ink printed on the print substrate can include a charge adjuvant. A charge adjuvant may be present with a charge director, and may be different to the charge director, and act to increase and/or stabilise the charge on particles, e.g. resin-containing particles, of an electrostatic composition. The charge adjuvant can include, but is not limited to, barium petronate, calcium petronate, Co salts of naphthenic acid, Ca salts of naphthenic acid, Cu salts of naphthenic acid, Mn salts of naphthenic acid, Ni salts of naphthenic acid, Zn salts of naphthenic acid, Fe salts of naphthenic acid, Ba salts of stearic acid, Co salts of stearic acid, Pb salts of stearic acid, Zn salts of stearic acid, Al salts of stearic acid, Cu salts of stearic acid, Fe salts of stearic acid, metal carboxylates (e.g. Al tristearate, Al octanoate, Li heptanoate, Fe stearate, Fe distearate, Ba stearate, Cr stearate, Mg octanoate, Ca stearate, Fe naphthenate, Zn naphthenate, Mn heptanoate, Zn heptanoate, Ba octanoate, Al octanoate, Co octanoate, Mn octanoate, and Zn octanoate), Co lineolates, Mn lineolates, Pb lineolates, Zn lineolates, Ca oleates, Co oleates, Zn palmirate, Ca resinates, Co resinates, Mn resinates, Pb resinates, Zn resinates, AB diblock co-polymers of 2-ethylhexyl methacrylate-co-methacrylic acid calcium, and ammonium salts, co-polymers of an alkyl acrylamidoglycolate alkyl ether (e.g. methyl acrylamidoglycolate methyl ether-co-vinyl acetate), and hydroxy bis(3,5-di-tert-butyl salicylic) aluminate monohydrate. In some examples, the charge adjuvant is aluminium di and/or tristearate and/or aluminium di and/or tripalmitate.

The charge adjuvant can constitute about 0.1 to 5% by weight of the solids of the liquid electrophotographic composition and/or ink printed on the print substrate. The charge adjuvant can constitute about 0.5 to 4% by weight of the solids of the liquid electrophotographic composition and/or ink printed on the print substrate. The charge adjuvant can constitute about 1 to 3% by weight of the solids of the liquid electrophotographic composition and/or ink printed on the print substrate.

In some examples, the electrophotographic composition is a liquid electrophotographic composition. The liquid electrophotographic composition may include the colorant and polymer resin described above. Additionally, the composition may include a liquid carrier. A charge adjuvant and/or a charge director may also be present in the composition. Suitable liquid carriers for the liquid electrophotographic composition are described below.

Carrier Liquid

Generally, the carrier liquid can act as a dispersing medium for the other components in the electrostatic composition. For example, the carrier liquid can comprise or be a hydrocarbon, silicone oil, vegetable oil, etc. The carrier liquid can include, but is not limited to, an insulating, non-polar, non-aqueous liquid that can be used as a medium for toner particles. The carrier liquid can include compounds that have a resistivity in excess of about $10^9$ ohm-cm. The carrier liquid may have a dielectric constant below about 5, in some examples below about 3. The carrier liquid can include, but is not limited to, hydrocarbons. The hydrocarbon can include, but is not limited to, an aliphatic hydrocarbon, an isomerized aliphatic hydrocarbon, branched chain aliphatic hydrocarbons, aromatic hydrocarbons, and combinations thereof. Examples of the carrier liquids include, but are not limited to, aliphatic hydrocarbons, isoparaffinic compounds, paraffinic compounds, dearomatized hydrocarbon compounds, and the like. In particular, the carrier liquids can include, but are not limited to, Isopar-G™, Isopar-H™, Isopar-L™, Isopar-M™, Isopar-K™, Isopar-V™, Norpar 12™, Norpar 13™, Norpar 15™, Exxol D40™, Exxol D80™, Exxol D100™, Exxol D130™, and Exxol D140™ (each sold by EXXON CORPORATION); Teclen N-16™, Teclen N-20™, Teclen N-22™, Nisseki Naphthesol L™, Nisseki Naphthesol M™, Nisseki Naphthesol H™, #0 Solvent L™, #0 Solvent M™, #0 Solvent H™, Nisseki Isosol 300™, Nisseki Isosol 400™, AF-4™, AF-S™, AF-6™ and AF-7™ (each sold by NIPPON OIL CORPORATION); IP Solvent 1620™ and IP Solvent 2028™ (each sold by IDEMITSU PETROCHEMICAL CO., LTD.); Amsco OMS™ and Amsco 460™ (each sold by AMERICAN MINERAL SPIRITS CORP.); and Electron, Positron, New II, Purogen HF (100% synthetic terpenes) (sold by ECOLINK™).

Before printing, the carrier liquid can constitute about 20% to 99.5% by weight of the electrostatic composition, in some examples 50% to 99.5% by weight of the electrostatic composition. Before printing, the carrier liquid may constitute about 40 to 90% by weight of the electrostatic composition. Before printing, the carrier liquid may constitute about 60% to 80% by weight of the electrostatic composition. Before printing, the carrier liquid may constitute about 90% to 99.5% by weight of the electrostatic composition, in some examples 95% to 99% by weight of the electrostatic composition.

The ink, when printed on the print substrate, may be substantially free from carrier liquid. In an electrostatic printing process and/or afterwards, the carrier liquid may be removed, e.g. by an electrophoresis processes during printing and/or evaporation, such that substantially just solids are transferred to the print substrate. Substantially free from carrier liquid may indicate that the ink printed on the print substrate contains less than 5 wt % carrier liquid, in some examples, less than 2 wt % carrier liquid, in some examples less than 1 wt % carrier liquid, in some examples less than 0.5 wt % carrier liquid. In some examples, the ink printed on the print substrate is free from carrier liquid.

Textile Substrate

The textile substrate may be any suitable textile or fabric substrate. The textile substrate may be woven or non-woven. The textile substrate may be formed of yarns, for example, spun threads or filaments of natural or synthetic material. The textile or fabric substrate can also be called bottom supporting substrate or textile/fabric supporting substrate. The word "supporting" also refers to a physical objective of the substrate which is to carry the coating and the image that is going to be printed. Any textile, fabric material, fabric clothing, or other fabric product where there is a desire for application of printed matter can benefit from the principles described herein. More specifically, textile or fabric substrates useful in present disclosure include substrates that have fibers that may be natural and/or synthetic. The term "textile" includes, by way of example, cloth, a fabric material, fabric clothing, or another fabric product. The textile structure may have a warp and weft and may be a woven, non-woven, knitted, tufted, crocheted, knotted, and pressured structure. The terms "warp" and "weft" refers to weaving terms that have their ordinary means in the textile arts, as used herein, e.g., warp refers to lengthwise or longitudinal yarns on a loom, while weft refers to crosswise or transverse yarns on a loom.

It is notable that the term "textile" or "fabric" substrate does not include materials commonly known as any kind of paper. Paper takes the form of sheets, rolls and other physical forms which are made of various plant fibers (like trees or mixture of plant fibers) with synthetic fibers by laid down on a fine screen from a water suspension.

Furthermore, textile substrates include both textiles in its filament form, in the form of fabric material, or even in the form of fabric that has been crafted into finished article (clothing, blankets, tablecloths, napkins, bedding material, curtains, carpet, shoes, etc.). In some examples, the textile substrate has a woven, knitted, non-woven or tufted structure.

The textile substrate can be a woven fabric where warp yarns and weft yarns are mutually positioned at an angle of about 90°. This woven fabric includes, but is not limited to, fabric with a plain weave structure, fabric with twill weave structure where the twill weave produces diagonal lines on a face of the fabric, or a satin weave. The textile substrate can be a knitted fabric with a loop structure including one or both of warp-knit fabric and weft-knit fabric. The weft-knit fabric refers to loops of one row of fabric are formed from the same yarn. The warp-knit fabric refers to every loop in the fabric structure that is formed from a separate yarn mainly introduced in a longitudinal fabric direction. The textile substrate can also be a non-woven product, for example a flexible fabric that includes a plurality of fibers or filaments that are one or both of bonded together and interlocked together by a chemical treatment process (e.g., a solvent treatment), a mechanical treatment process (e.g., embossing), a thermal treatment process, or a combination of two or more of these processes.

The textile substrate can include one or both of natural fibers and synthetic fibers. Natural fibers that may be used include, but are not limited to, wool, cotton, silk, linen, jute, flax or hemp. Additional fibers that may be used include, but are not limited to, rayon fibers, or those of thermoplastic aliphatic polymeric fibers derived from renewable resources, including, but not limited to, corn starch, tapioca products, or sugarcanes. These additional fibers can be referred to as "natural" fibers. In some examples, the fibers used in the textile substrate includes a combination of two or more from the above-listed natural fibers, a combination of any of the above-listed natural fibers with another natural fiber or with synthetic fiber, a mixture of two or more from the above-listed natural fibers, or a mixture of any thereof with another natural fiber or with synthetic fiber.

The synthetic fiber that may be used in the textile substrate is polymeric fiber including, but not limited to, polyvinyl chloride (PVC) fibers, polyvinyl chloride (PVC)-free fibers made of polyester, polyamide, polyimide, polyacrylic, polypropylene, polyethylene, polyurethane, polystyrene, polyaramid, e.g., Kevlar®, polytetrafluoroethylene, e.g., Teflon® (both trademarks of E. I. du Pont de Nemours and Company), fiberglass, polytrimethylene, polycarbonate, polyester terephthalate, or polybutylene terephthalate. In some examples, the fiber used in the textile substrate includes a combination of two or more of the fibers, a combination of any of the fibers with another polymeric fiber or with natural fiber, a mixture of two or more of the fibers, or a mixture of any of the fibers with another polymer fiber or with natural fiber. In some examples, the synthetic fiber includes modified fibers. The term 'modified fibers' refers to one or both of the polymeric fiber and the fabric as a whole having undergone a chemical or physical process such as, but not limited to, one or more of a copolymerization with monomers of other polymers, a chemical grafting reaction to contact a chemical functional group with one or both the polymeric fiber and a surface of the fabric, a plasma treatment, a solvent treatment, for example acid etching, and a biological treatment, for example an enzyme treatment or antimicrobial treatment to prevent biological degradation. The term "PVC-free" means no polyvinyl chloride (PVC) polymer or vinyl chloride monomer units in the substrate. In some examples, the textile substrate is a synthetic polyester fiber.

The textile substrate can contain both natural fibers and synthetic fibers. In some examples, the amount of synthetic fibers represents from about 20% to about 90% of the total amount of fibers. In some other examples, the amount of natural fibers represents from about 10% to about 80% of the total amount of fibers. In some other examples, the textile substrate comprises natural fibers and synthetic fibers in a woven structure, the amount of natural fibers is about 10% of a total fiber amount and the amount of synthetic fibers is about 90% of the total fiber amount. The textile substrate may further contains additives including, but not limited to, one or more of colorant (e.g., pigments, dyes, tints), antistatic agents, brightening agents, nucleating agents, antioxidants, UV stabilizers, fillers and lubricants, for example. Alternatively, the textile substrate may be pre-treated in a solution containing the substances listed above before applying the coating composition. The additives and treatments are included in order to improve various properties of the fabric.

Examples of textiles include synthetic fabrics, such as polyethylene terephthalate (PET), nylon and/or polyester. The synthetic fabric may be a woven or non-woven fabric. In one example, a PET substrate is coated, for example, on one (e.g. back or front) or both sides with a coating, such as nylon and/or polyester. An example of back side coated PET: Product code: PS2268. 100% polyester satin back coated. Examples of 2 side coated PET: Product code: P2008, 100% dip coating nylon taffeta two side coated, Product code: PN7702A9, Nylon/Polyester Blended Taffeta, Without Fluorescence, Two-Side Coated, made by: HUZHOU SINYLABEL MATERIAL CO., LTD and Product code: 7280N, White Dip Coated Nylon/Polyester Blend Taffeta, Slit Edge. Made by: Cole Fabrics Far East

EXAMPLES

Reference Example 1

Reference Samples

An image and text was printed on the two kind of fabrics prior to evaluation. The image was printed using liquid toner (LEP ink applied by HP indigo ws6600 digital press) and powder toner (applied by HP color LaserJet 5550 printer). The efficiency of the print protection was tested by applying the domestic washing and drying protocols described in details in ISO 6330. Less than 10% of the image printed by both kind of toners was left on the fabric substrates after applying 1 cycle of the domestic washing and drying protocols Comparative Example 2

Liquid Toner Printing, Primed Fabric Prior to Printing

An image and text were printed by using LEP ink applied by HP indigo ws6600 digital press printing system on a primed back side coated PET fabric. Michelman DigiPrime® 060 primer was applied on press using In-line priming (ILP) system (part of the HP Indigo Press). Coat speed was at 30 m/min using indirect gravure coating method with a 350 LCM anilox roller in speed of 30 m/min in 40° C. 20% of the ink was left on the fabric surface after 1 cycle of domestic washing and drying.

Comparative Example 3

Dry Toner on Non-primed Fabric, Followed by Coating the Substrate with a Water Resistant Coating An image and text were printed on a non-primed 2 side coated PET fabric by powder toner printed by HP color LaserJet 5550 printer. A water based over print varnish (OPV) Water Lac 1960 acrylic emulsion from EPOTEC was applied by dip coating. The coating was dried in an oven at 60° C. for 30 min. 20% of the ink was left on the fabric surface after one cycles of domestic washing and drying. In the second washing cycle the water base OPV failed in protecting the liquid toner and the results were similar to the reference.

Comparative Example 4

Liquid Toner Printing on Primed Fabric, Followed by Coating the Substrate with a Water Resistant Coating An image and text were printed using liquid toner (LEP ink applied by HP indigo ws6600 digital press) on a 2 side coated PET fabric primed with Michelman topaz 17 solution. The primer was applied using a laboratory Labo Combi 400 coater. Coat speed was at 30 m/min. The primer was coated using an indirect gravure coating method equipped with an anilox of 140 LCM and was dried at 70° C. A water based OPV Water Lac 1960 acrylic emulsion from EPOTEC was applied by dip coating. The coating was dried in an oven at 60° C. for 10 min. About 40% Of the ink was left on the fabric surface after one cycles of domestic washing and drying and 20% of the image was left after the second cycle.

Similar protection protocol failed in protecting an image that was printed using powder toner Example 5

Powder Toner Printing on Non-primed Fabric, by Coating the Substrate with Curable Water Based Coating Followed by Heat Curing after Printing An image and text were printed using powder toner applied by HP color LaserJet 5550 printer on a non-primed 2 side coated PET fabric. A water based cross-likable OPV AVCO-AVCOPRINT ABZ-500 styrene (acrylic based) from Avco chemicals LTD was applied by Rod draw down coating. The coating was heat cured in an oven at 150° C. for 3 min. About 40% of the ink was left on the fabric surface after one cycles of domestic washing and drying and 20% of the image was left after the third cycle.

Example 6

Liquid Printing on Non-primed Fabric, Coating the Substrate with Curable Water Based Coating Followed by Heat Curing after Printing An image and text was printed using liquid toner (LEP ink applied by HP indigo ws6600 digital press) on a non-primed 2 side coated PET fabric. A water based cross-likable OPV (AVCO-AVCOPRINT SAZ-SPSYNTOPRET OL-V (thermoplastic polyurethane) was applied by Rod draw down coating. The coating was heat cured in an oven at 150° C. for 3 min. About 80% of the ink was left on the fabric surface after ten cycles of domestic washing and drying. Similar results were obtained using AVCO-PLASTOPRINT PM (polyurethane thermoplastic coating) from Avco chemicals LTD Example 7

Liquid Printing on Primed Fabric, Coating the Substrate with Curable Water Based Coating Followed by Heat Curing after Printing An image and text was printed using liquid toner (LEP ink applied by HP indigo ws6600 digital press) on a 2 side coated PET fabric. The Michelman DigiPrime® 060 primer was applied. The primer was applied on press using In-line priming (ILP) system (part of the HP Indigo Press). Coat speed was at 30 m/min using indirect gravure coating method with a 350 LCM anilox roller in speed of 30 m/min in 40° C. The water based cross-likable OPV AVCO-AVCOPRINT ABZ-500 styrene (acrylic based) was applied post printing by wire rod draw down coating. The coating was heat cured in an oven at 150° C. for 1.5 min. 100% Of the ink was left on the fabric surface after 10 cycles of domestic washing and drying. Similar results were obtained using AVCO-PLASTOPRINT PM (polyurethane thermoplastic coating), AVCO-AVCOPRINT SAZ-SPSYNTOPRET OL-V (thermoplastic polyurethane) and AVCO-AVCOPRINT SAZ (acrylic based)) from Avco chemicals LTD The results of the Examples are summarised in the table below:

| example # | fabric | Primer | toner | over print varnish (OPV) | cross linking | number of washing cycles | ink coverage left after last cycle [%] |
|---|---|---|---|---|---|---|---|
| 1 (reference) | two side coated PET fabric | | powder | | — | 1 | 0 |
| 1 (reference) | back side coated PET fabric | | powder | | — | 1 | 0 |
| 1 (reference) | two side coated PET fabric | | liquid | | — | 1 | 0 |
| 1 (reference) | two side coated PET fabric | | liquid | | — | 2 | 0 |
| 2 | back side coated PET fabric | Michelman DigiPrime ® 060 | liquid | | — | 1 | 20 |
| 3 | two side coated PET fabric | | powder | Water Lac 1960 acrylic emulsion | — | 1 | 20 |
| 4 | two side coated PET fabric | Michelman topaz 17 solution | liquid | Water Lac 1960 acrylic emulsion | — | 2 | 20 |

-continued

| example # | fabric | Primer | toner | over print varnish (OPV) | cross linking | number of washing cycles | ink coverage left after last cycle [%] |
|---|---|---|---|---|---|---|---|
| 5 | two side coated PET fabric | | powder | AVCO-AVCOPRINT ABZ-500 styrene (acrylic based) | + | 3 | 20 |
| 6 | two side coated PET fabric | | liquid | AVCO-SPSYNTOPRET OL-V (thermoplastic polyurethane) | + | 10 | 80 |
| 7 | two side coated PET fabric | Michelman DigiPrime ® 060 | liquid | AVCO-AVCOPRINT ABZ-500 styrene (acrylic based) | + | 10 | 100 |

The invention claimed is:

1. A method of printing an image on a textile, said method comprising
    electrophotographically printing an image onto a textile substrate using an electrophotographic ink composition,
    applying a coating composition comprising a polymer and a crosslinking agent to the printed electrophotographic ink, and
    crosslinking the applied coating composition.

2. A method as claimed in claim 1, wherein the electrophotographic ink composition is a liquid electrophotographic ink.

3. A method as claimed in claim 2, wherein the liquid electrophotographic ink comprises:
    a colorant,
    an acid polymer resin,
    a charge adjuvant,
    a charge director, and
    a liquid carrier.

4. A method as claimed in claim 1, wherein the polymer coating is applied as an aqueous polymer solution or dispersion.

5. A method as claimed in claim 1, wherein the polymer coating comprises a polymer having a crosslinkable moiety.

6. A method as claimed in claim 1, wherein the polymer coating comprises a polymer having a —CN and/or carboxyl group.

7. A method as claimed in claim 5, wherein the polymer coating comprises a polymer selected from an acrylic- or polyurethane-based polymer.

8. A method as claimed in claim 7, wherein the polymer is a styrene-acrylic polymer or a polyurethane polymer.

9. A method as claimed in claim 1, wherein the polymer coating is crosslinked by exposure to heat and/or UV.

10. A method as claimed in claim 1, wherein the textile substrate is treated with a primer polymer coating prior to electrophotographic printing.

11. A method as claimed in claim 10, wherein the primer polymer coating comprises a primer polymer having a heteroatom-containing group.

12. A method as claimed in claimed in claim 11, wherein the primer polymer is selected from ethylene acrylic acid, polyethylene imine and polyamide resins.

13. A method as claimed in claim 1, wherein the textile substrate is a synthetic textile substrate.

14. A printed textile comprising
    a textile substrate,
    a layer of electrophotographically printed ink printed on the substrate, and
    a crosslinked polymer coating deposited on the layer of electrophotographically printed ink.

15. A printed textile as claimed in claim 14, wherein the textile substrate comprises a primer polymer coating deposited thereon, and wherein the layer of electrophotographically printed ink is printed over the primed substrate.

16. A method as claimed in claim 6, wherein the polymer coating comprises a polymer selected from an acrylic- or polyurethane-based polymer.

17. A method as claimed in claim 16, wherein the polymer is a styrene-acrylic polymer or a polyurethane polymer.

18. A method as claimed in claim 1, wherein the crosslinking agent includes blocked (poly) isocyanate.

19. A method as claimed in claim 1, wherein the polymer coating comprises a polymer having an isocyanurate or isocyanate group.

* * * * *